Feb. 3, 1959     G. O. ALTMANN     2,872,292
METHOD OF MAKING IRON NITRIDES
Filed March 25, 1952
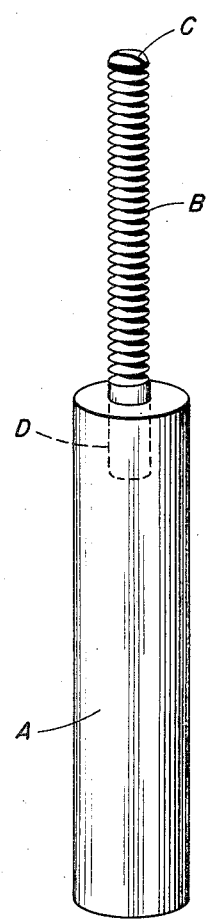
INVENTOR.
George O. Altmann
BY *Henry W. Coughlin*
*Henry B. Kellog*
ATTORNEYS

United States Patent Office 2,872,292
Patented Feb. 3, 1959

2,872,292

METHOD OF MAKING IRON NITRIDES

George O. Altmann, Westfield, N. J., assignor to General Aniline & Film Corporation, New York, N. Y., a corporation of Delaware Application March 25, 1952, Serial No. 278,484

3 Claims. (Cl. 23—191)

This invention relates to ferromagnetic powders of improved high frequency electromagnetic properties, to the process of preparing the same, and to shaped metallic articles for use in high frequency devices prepared from said powders.

It is known that electromagnetic cores prepared from powdered carbonyl iron can be utilized in high frequency coils, transformers, antenna loops, and the like. The purpose of such cores is to assure a high Q value or to provide an inductance control or both. The finely divided iron employed in the manufacture of the electromagnetic cores is frequently obtained by the thermal decomposition of iron pentacarbonyl as described in United States Patent 1,759,659. The pulverulence of the iron is absolutely essential in order to maintain power losses at a level sufficiently low to operate the high frequency devices efficiently. Experiments, which were subsequently confirmed by theory, have shown that there are three important types of high frequency power losses. These happen to be proportional to the first, second, and third power of frequency, respectively, and are now generally known as after-effect, eddy current, and dielectric leakance losses, respectively. The hysteresis and other losses are usually negligibly small at high frequencies because of the low magnetic fields prevailing.

The "first power loss" depends upon the magnetic state of the matter, particularly on the magnetic after-effect or magnetic viscosity. The "second power loss" or eddy current loss is proportional to the square of the average diameter of the magnetic powder particles and also to the volume conductivity of the particles. The "third power loss" is proportional to the currents that flow from particle to particle, and hence may be taken as the leakance currents of the capacitors formed by the particles with their surface coatings as dielectrics.

Iron powders obtained by the thermal decomposition of iron pentacarbonyl, as described in the foregoing patent, are usually in the form of microscopic spheres, each of which is composed of several hundred submicroscopic crystals. These contain 1 to 2% of impurities, i. e., approximately 0.2% of oxygen, 0.7% of carbon, and 0.5% of nitrogen.

It is an object of the present invention to provide a new ferromagnetic powder which can be processed into a high frequency material having a spherical shape with a diameter between 0.25 and 10 microns, exceedingly low eddy current power losses, a nitrogen content between 4.8 and 5.8%, and a carbon content between 0.5 and 0.8%.

Another object is to provide a process of preparing the said ferromagnetic powder.

A still further object is to provide shaped metallic articles prepared from said powder which are particularly useful as cores in electromagnetic devices.

Other objects and advantages will appear from the following description.

The ferromagnetic powder having the foregoing properties and characteristics is prepared from any non-reduced carbonyl iron powder by nitriding and transformation into face centered structure. The iron powder obtained by the thermal decomposition of iron pentacarbonyl, as described in United States Patent 1,759,659, is placed in boats or trays which are heated in an atmosphere composed of and maintained at 60 to 90% by volume of ammonia, with the remainder hydrogen. The temperature ranges between 350° and 450° C. The treating time ranges from 1 to 24 hours. Afterwards, the powder is subjected to ball milling, in order to break up clusters that may have formed by sintering, until a powder composed substantially of discrete spheres of practically the original sizes results. This powder may then be used for high frequency cores and possesses exceedingly low eddy current power losses.

The gas treatment can be carried out in a furnace where the gas stream passes over trays containing the powder. The rate of flow of the ammonia-hydrogen mixture is maintained so as to preserve the desired ratio of ammonia to hydrogen while the ammonia is being used up in the nitriding reaction. The speed of the reaction depends upon temperature, thickness of powder layer, and geometric factors. For practical purposes, a total flow of 3 to 15 cubic feet per minute of the gas mixture per 100 lbs. of powder may be used. The pressure of the gas mixture is approximately atmospheric. The nitriding reaction is completed when a sample shows, upon analysis, a nitrogen content ranging between 4.8 and 5.8%.

Certain variations of this method produce the same kind of powder. Admixtures of non-reactive gases, such as helium, nitrogen, and the like, to the ammonia-hydrogen mixture are possible so long as the ratio of ammonia to hydrogen remains within the aforestated limits. The hydrogen may be produced in one part of the furnace by cracking the required portion of ammonia. Annealing treatments in active or inert atmospheres given after the main treatment, were found to have some modestly beneficial effects. Other variations within the limits stated have usually the effect of increasing or decreasing simultaneously the permeability and the eddy current loss factor, thus producing no net gain.

The powder particles prepared as above are spherical in shape and have diameters between 0.25 and 10 microns. In spite of the nitriding treatment, it was found that the diameters of the particles hardly changed. This is unexpected since treatments of this kind, i. e., gaseous treatments at elevated temperatures such as with hydrogen, have always resulted in sintering and enlarging the particles. Moreover, cores prepared from the nitrided powders exhibit eddy current losses much lower than those of cores from ordinary powders of the same particle sizes. Specifically, the eddy current losses were found to be only $\frac{1}{4}$ to $\frac{1}{12}$ of those obtainable with ordinary magnetic powders of exactly the same particle size distribution. Apparently, it is the volume conductivity of the particles of this new nitrided powder which is reduced by the factor $\frac{1}{4}$ to $\frac{1}{12}$.

The magnetic permeability of the new nitride powder is essentially the same as that of the untreated powder and, hence, ranges from 6.0 to 13.0.

The "first power losses" are somewhat higher than those found with ordinary magnetic powders of exactly the same particle size distribution obtained by the thermal decomposition of iron pentacarbonyl, but are of no importance at high frequencies. The "third power losses" are lower. Chemically and physically, the material forming the powder particles is crystalline, of the face centered cubic system (hereinafter referred to as F. C. C.) with a lattice constant of about 3.8 A. U. The nitrogen content lies between 4.8 and 5.8%, and the carbon content lies between 0.5 and 0.8%. It resembles $Fe_4N$, iron tetritanitride, except that a portion of nitrogen may be replaced by carbon. In contrast, iron powders, particularly those obtained by the thermal decomposition of iron pentacarbonyl, appear to have crystals of only the body centered cubic system (hereinafter referred to as B. C. C.), with a lattice constant of about 2.86 A. U. and with nitrogen contents below 1%. The particle density is decreased in the new powder by 6 to 7% from that of ordinary magnetic powders of the same particle size distribution obtained from iron pentacarbonyl.

The following examples will describe in detail the methods for accomplishing the above objects, but it is to be understood that they are inserted merely for the purpose of illustration and are not to be construed as limiting the scope of the invention.

EXAMPLE I 40 lbs. of iron powder obained by the thermal decomposition of iron pentacarbonyl and characterized by a weight-average particle diameter of 8 microns, the particles being composed substantially only of body centered cubic $\alpha$-iron crystals with a lattice constant of 2.86 A. U., a carbon content of 0.73%, and a nitrogen content of 0.65%, were placed in a furnace. The furnace was heated to a temperature of 380° C. for 8 hours, while a stream of gas, composed of 3 cubic feet per minute of anhydrous ammonia and 1 cubic foot per minute of electrolytic hydrogen passed over the powder. Upon discharge, the powder was milled for 4 hours with 150 lbs. of steel balls in nitrogen. The powder was then ready to be fabricated into magnetic cores for high frequency devices.

50 grams of the powder obtained as above were insulated with 0.5 cc. of 60% aqueous phosphoric acid, as is customary, and thoroughly mixed with a binder, by applying 2.5 grams of a furfural formaldehyde resin in acetone and evaporating the solvent. A grainy powder results which was further mixed with 0.25 gram of a waxy lubricating powder, sold under the brand name of Acrawax-atomized C (available from the Glyco Products Company). 6-gram lots of this powder were molded into cylindrical cores of about ⅜ inch diameter and ¾ inch length using a pressure of 10 to 20 tons per square inch. The cores were cured for 30 minutes at 170° C. to harden the binder, after which they were ready for electromagnetic measurements. All of this is the conventional way of preparing cores for testing magnetic powders.

The electromagnetic tests are performed with Q meters from which Q values and tuning capacitances are read directly. Some of these Q values are shown in the following tables. From these values permeabilities and loss coefficients are readily obtained.

The meaning of the term "Q value" as used herein may be defined as follows:

$$Q = \frac{\text{reactance of coil}}{\text{series resistance}} = \frac{2\pi FL}{R}$$

$L$ = coil inductance (henries)
$R$ = series coil resistance (ohms)
$F$ = frequency at which L and R are measured As can be seen from the above formula, the value of "Q" will generally increase with an increase of coil inductance and decrease with an increase in coil resistance. The addition of an iron core will increase the inductance but also introduce eddy current and other losses. These losses act as and can be represented as an increase in effective coil resistance.

Particle size distributions are determined by an air separator, known as "Roller Particle Size Aanalyzer," according to a standard method, known as "Metal Powder Association Standard 12–51T."

Crystal type and size are determined by the well known Debye-Scherrer X-ray diffraction method.

Nitrogen contents are determined by the well known Kjeldahl method. Carbon contents are determined by controlled combustion with oxygen and measuring of the amount of absorbed carbon dioxide formed.

The standard method and the calculations employed in determining "initial permeability" and "eddy current loss coefficient" are modifications of the method described in an article by V. Legg, entitled "Magnetic Measurements at Low Flux Densities Using the A. C. Bridge," in Bell System Technical Journal, vol. 15 (1936), page 39. The method involved employs the measurement of the apparent Q value (quality factor) of the core, by means of a Q-meter while the core is inserted in a solenoid energized by various A. C. frequencies ($f$) up to 150 megacycles. The apparent Q values, determined by direct measurement, were corrected in accordance with the characteristics of the measuring instrument to yield actual Q values.

The effective resistance of the core ($R_{eff}$) is calculated from the Q value, frequency ($f$), and inductance (L) in accordance with the formula:

$$R_{eff} = 2\pi fL/Q$$

The effective resistance ($R_{eff}$) is the sum of the D. C. resistance ($R_o$) and the high frequency loss resistance components, respectively, due to dielectric leakance, residual loss, and eddy current loss. This relationship is expressed by the equation:

$$R_{eff} = R_o + CLf + eLf^2 + kL^2f^3$$

wherein the second term of the sum represents the aftereffect or residual loss resistance, C being its coefficient; the third term represents the eddy current loss resistance, $e$ being the eddy current loss coefficient, and the last term the dielectric leakance loss with a coefficient $k$ which, however, is of no further importance in these examples. All of the terms can be calculated from the measurements indicated above, and the value in ohms of the eddy current loss resistance can be obtained and made to yield the eddy current loss coefficient which is measured in ohms per henry and cycles-per-second squared.

For comparison, the same iron powder obtained by the thermal decomposition of iron pentacarbonyl as utilized above, but not subjected to the ammonia-hydrogen treatment was milled as described above and insulated and molded into 6-gram cores. The cores were then subjected to the same methods of analysis and referred to as old powder.

The following table illustrates the relative properties of cores prepared from the new ferromagnetic powder as compared with cores prepared from known carbonyl iron powder.

*Table 1*

| Quantity Measured | New Powder | Old Powder |
|---|---|---|
| (a) Average particle diameter (by weight), microns | 8.5 | 8.0 |
| (b) Eddy current loss coefficient, $\times 10^{-9}$ ohms/henry, cycles-per-second-squared | 0.25 | 1.3 |
| (c) Direct Q value at 60 megacycles | 149 | 72 |
| (d) Direct Q value at 80 megacycles | 113 | 51 |
| (e) Direct Q value at 100 megacycles | 83 | 34 |
| (f) Crystal system | f. c. c. | b. c. c. |
| (g) Lattice constant, A.U | 3.79 | 2.86 |
| (h) Nitrogen content, percent | 5.12 | 0.65 |
| (i) Carbon content, percent | 0.70 | 0.73 |

EXAMPLE II

The starting material and procedures were identical with Example I with the exception that 3.6 cubic feet per minute of ammonia and 0.4 cubic foot per minute of hydrogen were used.

EXAMPLE III

The starting material and procedures were identical with those of Example I with the exception that 2.4 cubic feet per minute of ammonia and 1.6 cubic feet per minute of hydrogen were used.

Identical milling, insulating, and analytical methods were applied to the cores of Examples II and III which yielded the following results:

Table 2

| Quantity Measured | Powder of Example II | Powder of Example III |
|---|---|---|
| (a) Average particle diameter (by weight), microns | 8.0 | 9.0 |
| (b) Eddy current loss coefficient × 10⁻⁹ ohms/henry, cycles-per-second-squared | 0.2 | 0.3 |
| (c) Direct Q value at 60 megacycles | 145 | 138 |
| (d) Direct Q value at 80 megacycles | 111 | 105 |
| (e) Direct Q value at 100 megacycles | 83 | 76 |
| (f) Crystal system | f. c. c. | f. c. c. |
| (g) Lattice constant, A.U. | 3.81 | 3.76 |
| (h) Nitrogen content, percent | 5.23 | 5.01 |
| (i) Carbon content, percent | 0.67 | 0.62 |

EXAMPLE IV 150 grams of the same starting material as in Example I were kept at 350° C. for 3 hours in a stream of 2.9 liters/min. of ammonia and 0.7 liter/min. of hydrogen and another lot of 150 grams were treated at 450° C. for the same time and in the same stream. Milling was done on 60 grams for 1 hour with 1000 grams of steel balls. The analysis methods were identical with the ones used for the other examples and gave the following results:

Table 3

| Quantity Measured | Temperature of Treatment | |
|---|---|---|
| | 350° C. | 450° C. |
| (a) Average particle diameter (by weight), microns | 8.0 | 9.5 |
| (b) Eddy current loss coefficient × 10⁻⁹ ohms/henry, cycles-per-second squared | 0.21 | 0.34 |
| (c) Direct Q value at 60 megacycles | 142 | 139 |
| (d) Direct Q value at 80 megacycles | 108 | 110 |
| (e) Direct Q value at 100 megacycles | 80 | 77 |

The foregoing examples serve to illustrate the upper and lower limits of temperature during the nitriding reaction which yield final products having desirable characteristics.

EXAMPLE V 150 grams of a powder containing smaller particles than those of the powder of the above examples (vide infra) but also made by the thermal decomposition of iron pentacarbonyl were used as the starting material. The gas flows were as in Example IV. The temperature of treatment was 400° C. The treatment and analysis otherwise were as before in Example IV. The results compared with those of the non-treated powder of the same particle size were as follows:

Table 4

| Quantity Measured | New Powder | Non-Treated Powder (5 Microns) |
|---|---|---|
| (a) Average particle diameter (by weight), microns | 5.5 | 5.0 |
| (b) Eddy current loss coefficient × 10⁻⁹ ohms/henry, cycles-per-second-squared | 0.15 | 0.56 |
| (c) Direct Q value at 60 megacycles | 193 | 95 |
| (d) Direct Q value at 80 megacycles | 151 | 68 |
| (e) Direct Q value at 100 megacycles | 109 | 47 |
| (f) Crystal system | f. c. c. | b. c. c. |
| (g) Lattice constant, A. U. | 3.79 | 2.85 |
| (h) Nitrogen content, percent | 4.99 | 0.59 |
| (i) Carbon content, percent | 0.67 | 0.67 |

The material of Example V was worked into a tuning core of conventional dimensions, i. e., 1.5 inches long, cylindrical, with a diameter of 0.195 inch and placed into a coil of 7 turns of wire. By moving the core, the coil could be tuned with a capacitance of 20 M. M. F. over the frequency range 88 to 108 megacycles while maintaining a Q value above 100. The non-treated material of Example V depressed the Q value to 55 when fully inserted in the coil at 88 megacycles.

EXAMPLE VI 150 grams of a still finer carbonyl iron powder of about 3 microns were milled for 2 hours with 3 grams of colloidal clay and with 1000 grams of steel balls. It was then subjected to the same procedure and analysis as used in Example V. The results, compared with the same powder not treated in ammonia-hydrogen, were as follows:

Table 5

| Quantity Measured | New Powder | Non-Treated Powder (3 Microns) |
|---|---|---|
| (a) Average particle diameter (by weight), microns | 3.0 | 3.0 |
| (b) Eddy current loss coefficient × 10⁻⁹ ohms/henry, cycles-per-second-squared | Below 0.05 | 0.39 |
| (c) Direct Q value at 60 megacycles | 221 | 120 |
| (d) Direct Q value at 80 megacycles | 174 | 91 |
| (e) Direct Q value at 100 megacycles | 125 | 65 |
| (f) Crystal system | f. c. c. | b. c. c. |
| (g) Lattice constant, A. U. | 3.82 | 2.87 |
| (h) Nitrogen content, percent | 5.55 | 0.57 |
| (i) Carbon content, percent | 0.63 | 0.65 |

The iron nitrides prepared in accordance with this invention, because of their stability under varying conditions of temperature and moisture, and their resistance to magnetic shocks, are particularly useful for high frequency cores, in transformers and inductance coils to increase the "Q" value, to vary the inductance, and to reduce the size of the coils. They are useful in magnetic clutches and brakes.

In addition to being useful for the foregoing magnetic purposes, the iron nitrides are also of practical and commercial utility in the preparation of fabricated solid materials. For example, the ferromagnetic powder may be solidified by heating it at elevated temperatures ranging from 600 to 1200° C. in a nitrogen or nitrogen-ammonia atmosphere, e. g., one in which the ammonia content is about 10%. The sintered material thus obtained can be fabricated into abrasive wheels in metallurgical technique, or can be used as catalysts in the ammonia synthesis and in other chemical reactions involving catalytic agents. The transformed powders are useful in the manufacture of solid shaped articles, such as screws, bolts, plates, and various fabricated items which are normally prepared from steel and cast iron, and those which would advantageously be exposed to a conventional nitriding treatment.

The accompanying drawing, which is in perspective, illustrates a representative shaped article prepared from the powdered iron nitride. By reference thereto it will be noted that A represents a cylindrical core molded from the iron nitride powder which has been worked up with insulator, binder and lubricant as described above. B represents a brass threaded stud insert with a stud thread. The location of the slot for the threaded stud is represented by C, whereas D represents the location of the inserted molded-in portion of the stud B.

While I have disclosed the preferred embodiments of my invention, it will be readily apparent to those skilled in the art that many changes and variations may be made therein without departing from the spirit thereof. For example, instead of employing a furfural-formaldehyde condensation product or a urea-formaldehyde or a phenol-formaldehyde condensation product as a bonding material for the ferromagnetic powder, it is to be understood that any monomeric or polymeric material, in a suitable volatile solvent, which when heated will polymerize or set may be employed. Accordingly, the scope of the invention is to be limited solely by the appended claims.

I claim:

1. The process of preparing iron nitrides of improved high frequency electromagnetic properties in which the particles are crystalline of the face centered cubic system with a lattice constant of approximately 3.8 A. U. and having a spherical shape with a diameter between 0.25 and 10 microns, a nitrogen content between 4.8 and 5.8%, and a carbon content between 0.5 and 0.8%, which comprises heating iron powder, obtained by the thermal decomposition of iron pentacarbonyl, at a temperature ranging from 350 to 450° C. in the presence of a gas mixture containing 60 to 90 parts by volume of ammonia and 10 to 40 parts by volume of hydrogen for a period of time sufficient to yield a powder having a nitrogen content between 4.8 and 5.8%.

2. The process of preparing iron nitrides of improved high frequency electromagnetic properties in which the particles are crystalline of the face centered cubic system with a lattice constant of approximately 3.8 A. U. and having a spherical shape with a diameter between 0.25 and 10 microns, a nitrogen content between 4.8 and 5.8%, and a carbon content between 0.5 and 0.8%, which comprises heating iron powder obtained by the thermal decomposition of iron pentacarbonyl, at a temperature ranging from 350 to 450° C. in the presence of a gas mixture containing 60 to 90 parts by volume of ammonia and 10 to 40 parts by volume of hydrogen at atmospheric pressure and at a flow of 3 to 15 cubic feet per minute per 100 lbs. of the said iron powder for a period of time sufficient to yield a powder having a nitrogen content between 4.8 and 5.8%.

3. The process according to claim 2 wherein the heating time ranges from 1 to 24 hours.

References Cited in the file of this patent

UNITED STATES PATENTS

| | | |
|---|---|---|
| 1,759,659 | Mittasch et al. | May 20, 1930 |
| 2,601,212 | Polydoroff | June 17, 1952 |

OTHER REFERENCES

Lowry's "Inorganic Chem.," 2nd ed. (1931), pages 938, 939, MacMillan and Co., Ltd., London.

J. W. Mellor's "A Comprehensive Treatise on Inorganic and Theoretical Chem., vol. 8, 1928 ed., pp. 133–135, and vol. 13, 1934 ed., pp. 340, 341.

Comptes Rendus, v. 222, pp. 1170–1172 (1946).

Hackh's Chemical Dictionary, 2nd ed., page 498, P. Blakiston's Sons and Co., Inc., Philadelphia, Pa.